Jan. 20, 1959   J. W. ROBERTS   2,869,678
ELECTROSTATIC PRECIPITATORS
Filed May 11, 1956   2 Sheets-Sheet 1

John W. Roberts
INVENTOR
BY Robert J. Palmer
ATTORNEY

United States Patent Office 2,869,678
Patented Jan. 20, 1959

2,869,678

ELECTROSTATIC PRECIPITATORS

John W. Roberts, Norwood, Mass., assignor to Westinghouse Electric Corporation, East Pittsburgh, Pa., a corporation of Pennsylvania Application May 11, 1956, Serial No. 584,251

4 Claims. (Cl. 183—7)

This invention relates to electrostatic precipitators, and has as its objects to simplify and to reduce the costs of electrostatic precipitators used for cleaning air.

The U. S. Patent No. 2,535,696 of E. L. Richardson discloses a collector cell which is widely used in electrostatic precipitators having separate and independent ionizers. Such a collector cell has flanged end plates between which are supported alternately arranged ground and charge collector plates.

This invention converts such a collector cell to a complete precipitator by supporting an ionizer from it. In one embodiment of this invention, the end ground plates are omitted leaving spaces for metal tubes which are attached to and supported from the end charge plates and the next adjacent charge plates. The tubes support spring arms which extend upstream of the cell, and between the outer ends of which ionizer wires extend. A pair of baffle plates of metal is provided, such plates being attached to the flanges on the end plates, and have portions which extend upstream of the cell past the ionizer wires, forming end, non-discharging ionizer electrodes. Other metal plates are supported from the flanges on the end plates, and extend midway between the ionizer wires, forming intermediate, non-discharging ionizer electrodes.

This invention will now be described with reference to the annexed drawings, of which:

Figure 1:
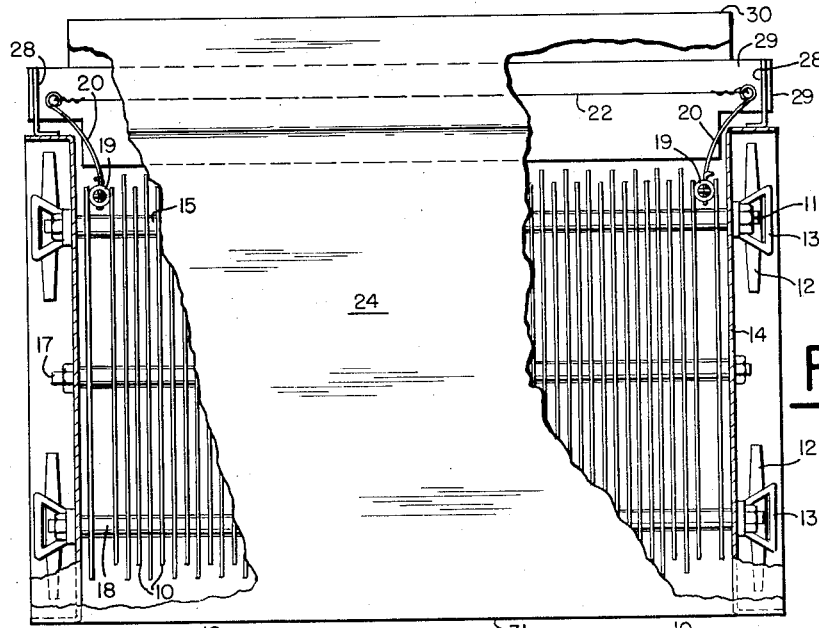
Fig. 1 is a side view, partially in section, and with parts of the adjacent baffle plate removed, of an electrostatic precipitator embodying this invention.
Figure 2:
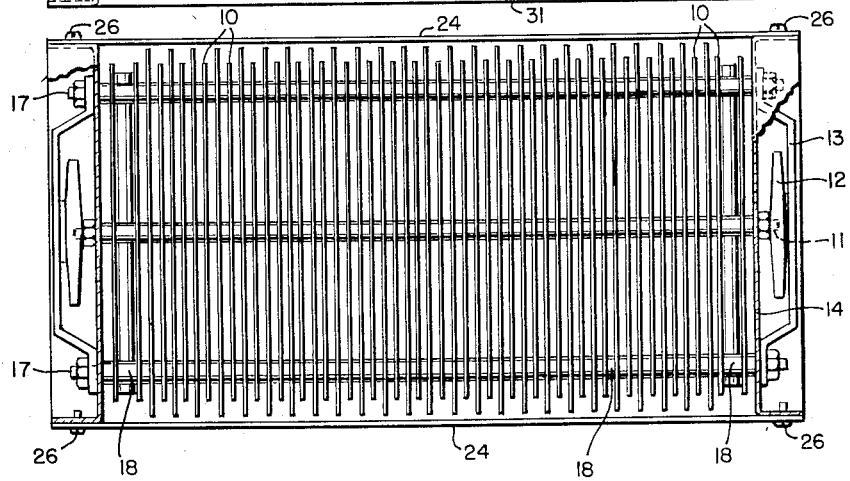
Fig. 2 is a back (downstream side) view of the precipitator, with portions of the flanged end plates removed, and other portions in section.
Figure 3:
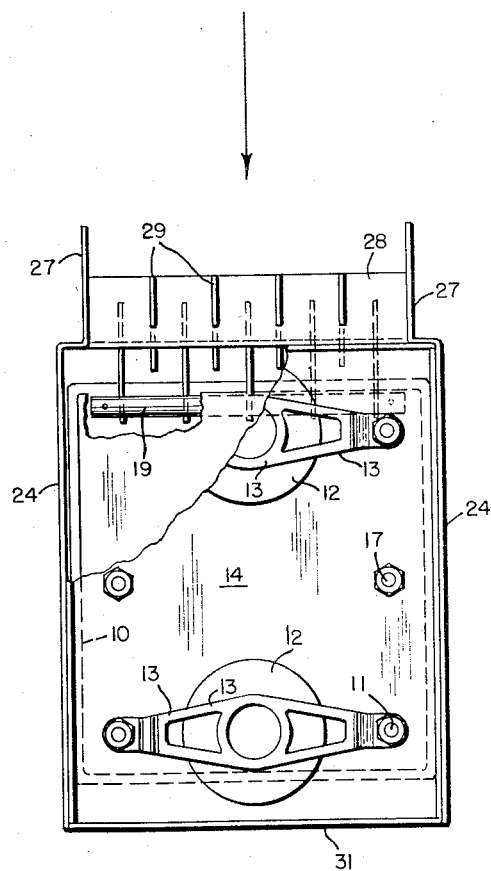
Fig. 3 is an end view of the precipitator, with a portion of the adjacent flanged end plate removed.

Charge collector plates 10 are supported on tie rods 11 which are attached to insulators 12 which are attached to brackets 13 which, in turn, are attached to flanged end plates 14. Spacers 15 space the plates 10 apart, and extend through clearance openings in ground plates 16. The ground plates 16 are supported on tie rods 17, the ends of which are attached to the end plates 14. Spacers 18 space the plates 16 apart, and extend through clearance openings in the charge plates 10.

The two ground plates at the ends of the precipitator, which ordinarily would extend between the end charge plates 10 and the next adjacent charge plates, are omitted, leaving spaces in which are placed metal tubes 19 which are attached to the end charge plates 10 and the next adjacent charge plates, these tubes extending parallel to the upstream edges of the plates. Ionizer wire supporting arms of spring metal identified by the reference characters 20, are attached at their inner ends to the tubes 19. The arms 20 extend upstream of the collector plates, and flare outwardly, their outer ends supporting the ends of ionizer wires 22.

Baffle plates 24, also of metal, are attached to the flanges of the end plates 14 by machine screws 26, and extend across opposite sides of the collector cell. The baffle plates 24 have portions 27 which extend upstream past the ionizer wires 22, and form end, non-discharging, ionizer electrodes. The plate portions 27 are closer together than the other portions of the baffle plates 24 for providing an ionizer which is smaller, lengthwise of the cell than the cell.

Flanged supports 28 are attached to the flanges of the end plates 14, and extend upstream thereof, and support metal plates 29 which extend midway between the ionizer wires 22, and form intermediate, non-discharging, ionizer electrodes. The plates 29 are supported near their ends in slots in the supports 28, and cut away at their inner corners for clearing the adjacent portions of the flanged end plates.

The baffle plates 24 together with the flanged end plates 14 enclose two opposite sides and the ends of the collector cell, leaving an open air inlet side 30, and an open air outlet side 31. Thus, the unit as illustrated by the drawings can be used as an electrostatic precipitator without requiring an external casing or cabinet.

The baffle plates 24 permit one precipitator unit to be stacked upon another similar unit, or placed against a similar unit alongside thereof, and prevent by-pass air from passing between the units. The units can be connected to ducts or placed within decorative or functional cabinets or casings.

A precipitator of this type is known as a "single voltage" unit, the ionizer wires and the charge plates being at the same voltage. A power pack which is not illustrated, would have a high voltage D. C. terminal connected to the charge plates 10, the ionizer wires 22 receiving their voltage through being connected to the charge plates.

What I claim is:

1. An electrostatic precipitator comprising a plurality of spaced-apart, parallel, charge and ground collector plates, and structural end plates, the end charge plates being adjacent said structural end plates, the plates next adjacent said end charge plates being charge plates, the charge and ground plates between said next adjacent charge plates being alternately arranged, ionizer wire supporting members between and attached to said end and next adjacent charge plates, ionizer wire supporting arms of spring metal attached to said members, and ionizer wires attached at their ends to said arms.

2. An electrostatic precipitator as claimed in claim 1 in which non-discharging ionizer electrodes are supported from said structural end plates and extend on opposite sides of said wires.

3. An electrostatic precipitator as claimed in claim 1 in which the structural end plates have flanges at their sides extending perpendicular to said structural end plates, in which metal baffle plates are attached to said flanges at opposite sides of said structural end plates, and in which said baffle plates have portions extending past said ionizer wires which form end non-discharging ionizer electrodes.

4. An electrostatic precipitator as claimed in claim 3 in which other metal plates are supported from other flanges on said structural end plates midway between said wires and form intermediate non-discharging ionizer electrodes.

References Cited in the file of this patent

UNITED STATES PATENTS 2,359,149    Pegg _____ Sept. 26, 1944

FOREIGN PATENTS 877,056    France _____ Aug. 24, 1942